US008584334B2

(12) United States Patent
Solleder et al.

(10) Patent No.: US 8,584,334 B2
(45) Date of Patent: Nov. 19, 2013

(54) WIDENING DEVICE, OBJECT LABELED BY A WIDENING DEVICE FOR LABEL SLEEVES AND METHOD FOR LABELLING OBJECTS

(75) Inventors: Hermann Solleder, Wald (DE); Bernd Braatz, Muenchenbernsdorf (DE)

(73) Assignee: Krones AG, Neutraubling (DE)

( * ) Notice: Subject to any disclaimer, the term of this patent is extended or adjusted under 35 U.S.C. 154(b) by 1003 days.

(21) Appl. No.: 12/632,197

(22) Filed: Dec. 7, 2009

(65) Prior Publication Data

US 2010/0159169 A1 Jun. 24, 2010

(30) Foreign Application Priority Data

Dec. 19, 2008 (DE) ......................... 10 2008 055 562

(51) Int. Cl.
*B23P 13/00* (2006.01)

(52) U.S. Cl.
USPC ...................... 29/235; 29/276; 29/268; 269/6

(58) Field of Classification Search
USPC ........... 29/235, 255, 268, 261, 278, 280, 276, 29/257; 269/3, 6, 95
See application file for complete search history.

(56) References Cited

U.S. PATENT DOCUMENTS

| | | | | |
|---|---|---|---|---|
| 3,393,633 | A | 7/1968 | Hoffman et al. | |
| 4,243,466 | A | 1/1981 | Lindee | |
| 4,357,788 | A | 11/1982 | Amberg | |
| 4,373,980 | A * | 2/1983 | Skalmierski et al. | 156/160 |
| 4,470,241 | A | 9/1984 | Parry et al. | |
| 4,673,174 | A * | 6/1987 | Tabbert | 269/41 |
| 5,058,869 | A * | 10/1991 | Ruthven | 269/45 |
| 5,513,838 | A * | 5/1996 | Van Rossum | 269/203 |
| 5,588,278 | A | 12/1996 | Wynn et al. | |
| 5,863,033 | A * | 1/1999 | Bradford | 269/3 |
| 5,895,035 | A * | 4/1999 | Bley | 269/6 |
| 6,000,686 | A * | 12/1999 | Yates | 269/6 |
| 6,161,823 | A * | 12/2000 | Bradford | 269/3 |
| 7,156,004 | B1 * | 1/2007 | Whitehead et al. | 81/420 |
| 7,546,691 | B2 * | 6/2009 | Mackey | 33/613 |
| 2001/0002614 | A1 | 6/2001 | Menayan | |
| 2010/0159169 | A1 * | 6/2010 | Solleder et al. | 428/35.1 |

FOREIGN PATENT DOCUMENTS

| | | |
|---|---|---|
| CN | 101316761 | 12/2008 |
| DE | 202005018176 | 6/2006 |
| EP | 0547754 | 6/1993 |
| EP | 0637546 | 2/1995 |
| EP | 0 584 516 B1 | 4/1998 |
| FR | 2685677 | 7/1993 |
| JP | 01 0 99 935 A | 4/1989 |
| JP | 1111646 A | 4/1989 |
| JP | 07 1 56 927 A | 6/1995 |
| JP | 09 1 10 025 A | 4/1997 |

(Continued)

*Primary Examiner* — Lee D Wilson
(74) *Attorney, Agent, or Firm* — Simpson & Simpson, PLLC

(57) ABSTRACT

The invention discloses a widening device and a method for applying label sleeves on objects. The inner diameter of the label sleeve is smaller than a diameter of a perimeter of the objects on which the label sleeve is to be applied. The widening device had four articulated widening jaws which engage an inner surface of the label sleeve. The third widening jaw and the fourth widening jaw are movably arranged between the first widening jaw and the second widening jaw. An articulated support carries the third widening jaw and the fourth widening jaw, wherein the articulated support is made up of a first and a second movable lever.

9 Claims, 7 Drawing Sheets

(56) References Cited

FOREIGN PATENT DOCUMENTS

| | | | |
|---|---|---|---|
| JP | 02 6 39 658 | B2 | 8/1997 |
| JP | 09272503 | | 10/1997 |
| JP | 2000 0 43 835 | A | 2/2000 |
| JP | 2000 2 96 823 | A | 10/2000 |
| NL | 10 00 814 | C | 1/1997 |
| WO | 00/66437 | A1 | 11/2000 |

* cited by examiner

WIDENING DEVICE, OBJECT LABELED BY A WIDENING DEVICE FOR LABEL SLEEVES AND METHOD FOR LABELLING OBJECTS

CROSS REFERENCE TO RELATED APPLICATIONS

This patent application claims priority of German Patent Application No. DE 10 2008 055 562.2, filed on Dec. 19, 2008, the application is incorporated herein by reference.

FIELD OF THE INVENTION

The present invention relates to a widening device for applying label sleeves on objects.

The invention also relates to an object labeled by a widening device for label sleeves.

Furthermore the invention relates to a method for labeling objects with label sleeves.

BACKGROUND OF THE INVENTION

The international patent application WO 00/66437 A1 relates to a method and an apparatus for applying a label sleeve on objects such as bottles and the like. A widening jaw unit with two widening jaws seizes the leading edge of the label sleeve and the label sleeve is slipped over the object in an axial direction. Before the slipping over the object is held fixed by a region of its outer surface in a form- or friction-locking way. At the initiation of the slipping over step the fixed hold on the outer surface is temporarily released. As soon as the widening jaw unit at least partially encompasses the object's outer surface, and not later than the desired position of the label sleeve on the object is reached, the object is seized again by a region of its outer surface which now is covered by a label. The label is held fixed in a slip-proof way while the widening jaw unit is pulled off.

The European patent 0 584 516 discloses an apparatus for applying sleeve-shaped labels on a plurality of bottles or other containers. The apparatus comprises a turn table with discs arranged equidistantly along a common arch for holding free-standing bottles. Above each disc a rolled supply of label sleeves, a device for separating label sleeves, and a pair of widening jaws, which can be raised and lowered, for seizing the separated label sleeves are provided. Each pair of widening jaws consists of an inner widening jaw for accommodating the label sleeve and an outer fixing element for fixing the label sleeve on the widening jaw. For slipping a label sleeve on a bottle the label sleeve is seized by the inner widening jaws and fixed by the outer fixing element. After slipping the label sleeve over the bottle first the fixing elements are released in order to then remove the inner widening jaws from the label sleeve.

The U.S. Pat. No. 4,357,788 discloses an apparatus and a method for applying sleeves on packing containers. The sleeves are picked up by suction cups, which are arranged on an arm. For picking up the sleeve a vacuum is applied to the suction cups. The arm is positioned opposite a second arm, so that the sleeves can be opened after having been picked up. The opening is done by moving the arms apart. Subsequently the opened sleeve is slipped over the packing container by the two arms and positioned. In order to pass the sleeve to the packing container the vacuum supply of the suction cups is switched off, so that the sleeve is released.

The U.S. Pat. No. 4,234,466 relates to a semi-automatic apparatus for applying sleeves to packing containers. The sleeves are inserted into a holding device manually, i.e. by an operator. In the holding device the sleeve is fixed by several thin metal fingers and widened by them. The packing container is fed to the apparatus with a conveyor. When the packing container is under the sleeve in the holding device, it is pushed into the sleeve from below by a lifting device. If the lifting device has reached a set height, the sleeve is released and thus applied on the container.

SUMMARY OF THE INVENTION

It is an object of the present invention to provide a widening device which allows the application of a label sleeve on an object accurately and dependably.

The above object is achieved by a widening device for applying label sleeves on objects wherein an inner diameter of the label sleeve is smaller than a diameter of a perimeter of the objects on which the label sleeve is to be applied, the widening device comprises: two articulated widening jaws, wherein the widening jaws engage an inner surface of the label sleeve; a third widening jaw and a fourth widening jaw are movably arranged between the first widening jaw and the second widening jaw in such a way that the third widening jaw and the fourth widening jaw also engage the inner surface of the label sleeve; an articulated support which carries the third widening jaw and the fourth widening jaw, wherein the articulated support is made up of a first and a second movable lever and a common pivot for pivotably connection the levers.

It is a further object of the present invention to provide a method for applying a label sleeve on an object accurately and dependably.

This object is achieved by the method comprising the following steps:

- tacking up an elastically dilatable label sleeve with a widening device, wherein the widening device comprises four widening jaws which are in contact with an inner surface of the label sleeve;
- widening the label sleeve, wherein the four widening jaws move away from each other radially in order to widen the label sleeve;
- slipping the dilated label sleeve over an object with the widening device in an axial direction;
- releasing the label sleeve, wherein the four widening jaws move towards each other radially, and wherein the label sleeve is in contact with the object to be labeled; and
- removing the widening device from the labeled object, wherein the four widening jaws are pulled from between the inner surface of the label sleeve and the object.

The widening device according to the invention is provided for applying label sleeves on objects. The inner diameter of the label sleeve is smaller than the diameter of the perimeter of the object on which the label sleeve is to be applied. The widening device comprises a third widening jaw and a fourth widening jaw, which are movably arranged between the first widening jaw and the second widening jaw. The third widening jaw and the fourth widening jaw also engage the inner surface of the label sleeve. The third widening jaw and the fourth widening jaw are mounted on an articulated support. The articulated support consists of a first and a second movable lever, and the levers are pivotably connected with each other by a common pivot. In order to achieve a uniform widening of the label sleeve with the widening device the fourth widening jaw is provided. This fourth widening jaw also engages the inner surface of the label sleeve.

The first widening jaw and the second widening jaw are movable towards and away from each other radially. Analogously the third widening jaw and the fourth widening jaw are also movable towards and away from each other radially. In order to engage the inner surface of the label sleeve the widening jaws move away from each other. In order to release the inner surface of the label sleeve the widening jaws are moved towards each other.

A first direction of motion of the first widening jaw and of the second widening jaw, respectively, are 180° opposed. Likewise a second direction of motion of the third widening jaw and of the fourth widening jaw, respectively, are 180° opposed. Moving along the first and second direction of motion, respectively, the widening jaws, which are arranged in pairs, move away from or towards each other. In a preferred embodiment the first and the second direction of motion are perpendicular to each other.

The first widening jaw is mounted on a first arm and the second widening jaw is mounted on a second arm of the widening device. The third widening aw and the fourth widening jaw are each mounted on a separate articulated support. Each of these supports is hinged to the first arm and the second arm of the widening device. The third widening jaw and the fourth widening jaw are each mounted on a respective support. This support is hinged to the common pivot for the movable levers.

The articulated supports exhibiting the third and the fourth widening jaws consist of a first and a second movable lever. These levers are pivotably connected with each other by a common pivot. Furthermore the ends of the levers opposite the common pivot are hinged to the first arm and to the second arm of the widening device with a respective pivot.

The first arm and the second arm of the widening device each exhibit a sliding guide. In these sliding guides the ends of the movable levers opposite the common pivot are guided. This guiding of the pivot points of the support is necessary for moving the first arm and the second arm in the first direction of motion. If the pivots were mounted rigidly, a complete opening of the arms would be impossible.

One of the movable levers of each support exhibits a further sliding guide engaged by a pin. By the guided pin the movement in the second direction of motion of the third widening jaw and of the fourth widening jaw mounted on the respective support is limited. The limitation of the movement in the second direction of motion is important for the proper functioning of the widening device. The limitation of the movement prevents the third widening jaw's and the fourth widening jaw's moving outwards beyond a certain point. This point is generally known as dead center and designates the point at which the support with the respective widening jaw breaks out. This breaking out can cause disruptions in the use of the widening device or an over-stretching of the label sleeve.

The widening jaws exhibit at least one curved surface which makes contact with the inner surface of the label sleeve. It is furthermore possible that the widening jaws are shaped like an arch. The design of the widening jaws depends on the outward shape of the object to be labeled. If the object exhibits a round shape, it is advantageous to provide the widening jaws with an arched shape, in order to achieve a uniform and round widening of the label sleeve. In the case of objects with an outline that significantly deviates from a round shape, it is advantageous to design the widening jaws in the shape of rods with a corresponding curvature, in order to adapt the shape of the dilated label sleeve to the outward shape of the object as accurately as possible.

The use of the widening device according to the invention allows to apply label sleeves for labeling objects on the objects without disruptions.

The widening device according to the invention applies label sleeves on objects. It is obvious to a person skilled in the art that the objects need not be filled with liquids only. The objects can be filled with solids, too. Furthermore the objects need not be used exclusively for food. Other products like oil or fats can be filled into them as well. Also in the non-food sector the objects can be filled with liquids and/or solid substances. The objects can be bottles, cans, or wide-mouth containers that can be provided with a lid. An example of a wide-mouth container that can be provided with a lid is a jar for pickled gherkin.

The method for labeling objects comprises as a first step that a label sleeve is picked up with a widening device. The widening device exhibits at least three widening jaws. For widening the label sleeve the widening jaws are brought into contact with an inner surface of the label sleeve. In a further step the label sleeve is widened, wherein the at least three widening jaws move away from each other radially. By this movement of the widening jaws the label sleeve is widened to the required dimensions. After the widening the dilated label sleeve is slipped onto the object by the widening device. In the slipping process the label sleeve is pulled over the object in an axial direction. It is obvious to a person skilled in the art that the label sleeve need not necessarily be pulled over the object. It is also possible to push the object into the widened label sleeve from below. Thus the pulling is not to be considered a limitation of the invention. After the label sleeve has been pulled over the object, the label sleeve is released. For releasing, the at least three widening jaws are moved towards each other radially. After releasing the label sleeve is in contact with the object to be labeled. In the final step the widening device is removed from the labeled object. This is done by pulling the at least three widening jaws from between the inner surface of the label sleeve and the object.

BRIEF DESCRIPTION OF THE DRAWINGS

In the following, embodiments will explain the inventive method and the inventive apparatus and their advantages in more detail with reference to the accompanying drawings.

DETAILED DESCRIPTION OF THE INVENTION

Figure 1:
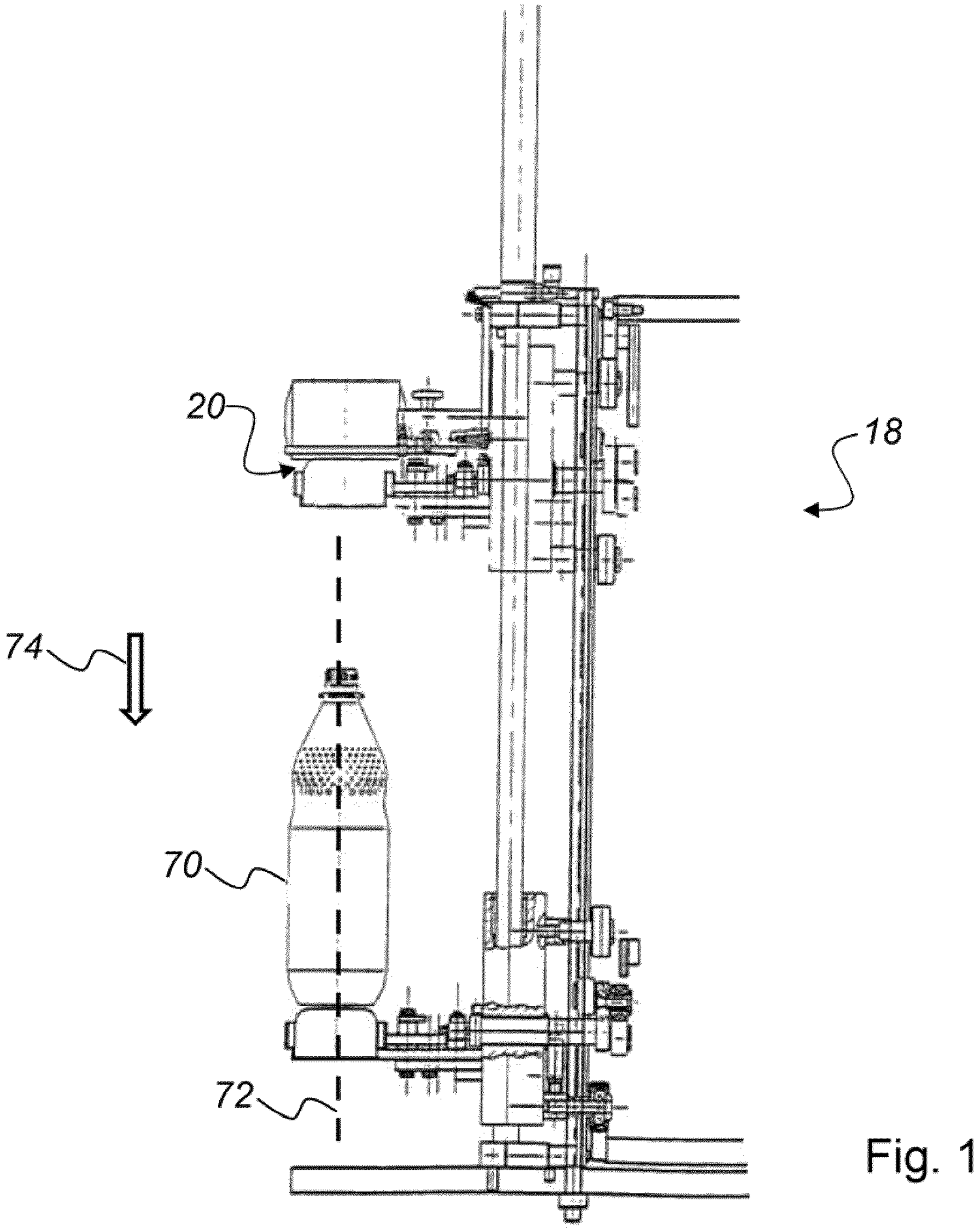
FIG. 1 schematically shows an apparatus for labeling objects.

Identical reference numerals are used for like elements or elements of like function of the invention. Furthermore only those reference numerals are shown in the individual figures which are required for the description of the respective figure. The embodiments shown are only examples of how the widening device of the invention can be constructed and do not constitute a limitation of the scope of the invention.

FIG. 1 schematically shows an apparatus 18 for labeling objects 70. With the apparatus 18 for labeling the label sleeves (not shown) are slipped over the object 70 with the widening device 20 for label sleeves along the longitudinal axis 72 of the object 70 in axial direction 74.

Figure 2:
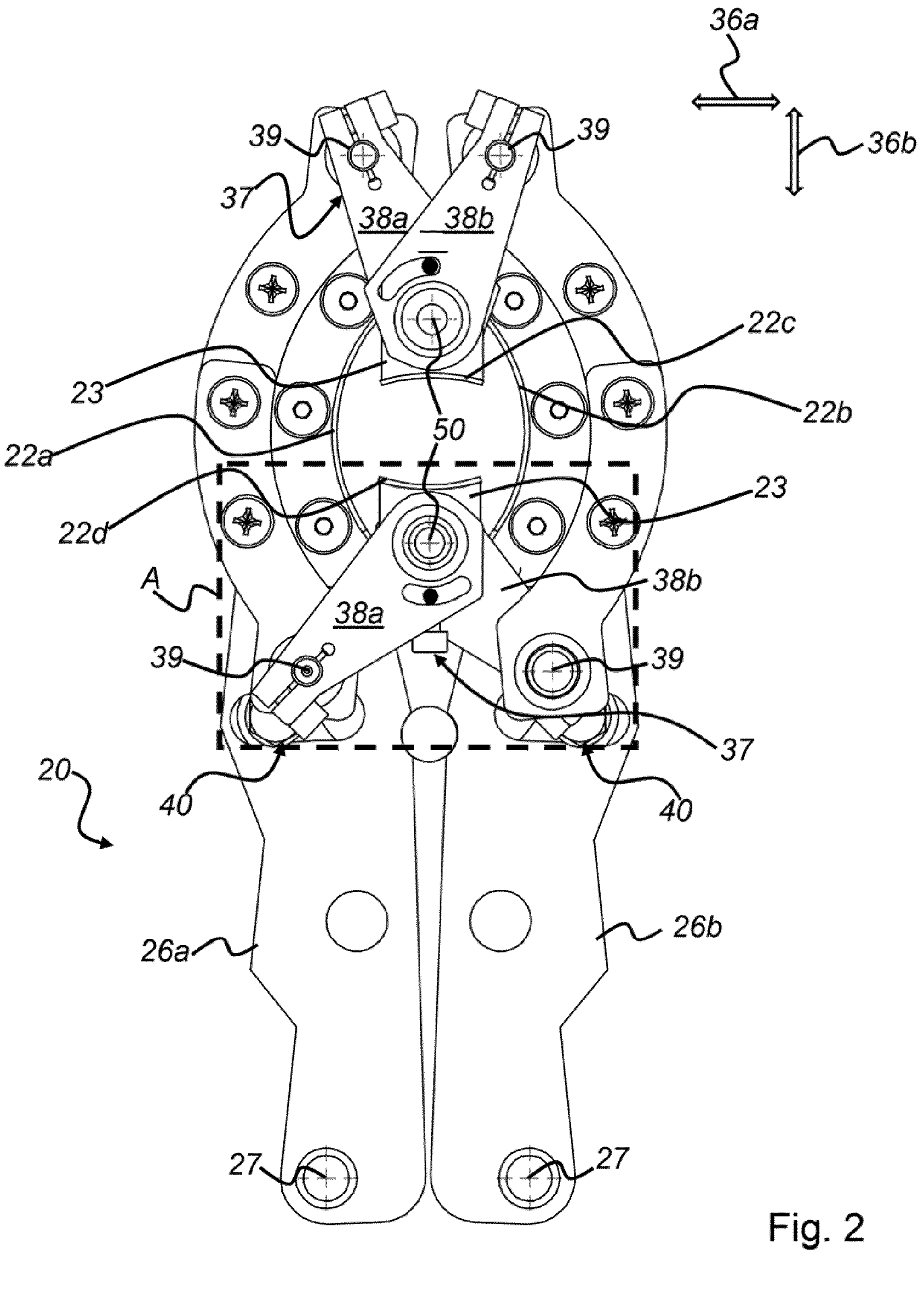
FIG. 2 schematically shows a closed widening device.
Figure 6:
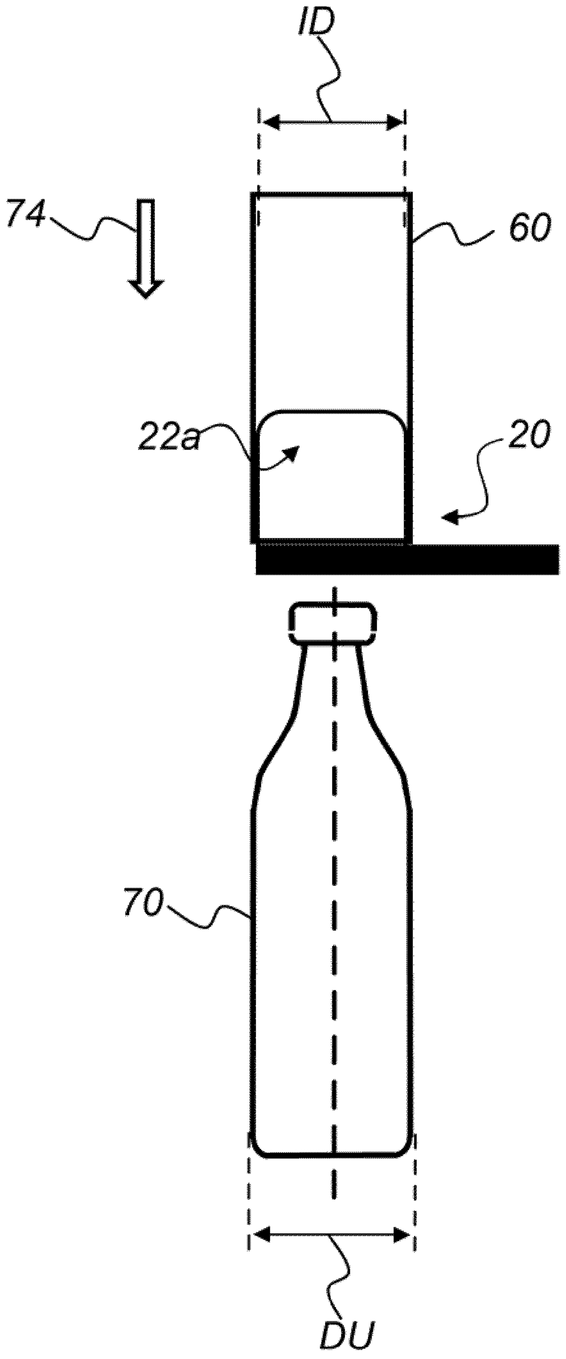
FIG. 6 schematically shows the arrangement of a label sleeve before it is applied on an object.

FIG. 2 schematically shows a closed widening device 20 for label sleeves 60 (see FIG. 6). A first arm 26*a* exhibits the first widening jaw 22*a* and a second arm 26*b* exhibits the second widening jaw 22*b*. The first arm 26*a* and the second arm 26*b* are pivoted on the respective pivots 27 of the arms 26*a* and 26*b*. In order to widen the label sleeve (not shown) the first widening jaw 22*a* and the second widening jaw 22*b* are moved radially away from each other 180° opposed along the first direction of motion 36*a*. At the movement in the first direction of motion 36*a* the articulated supports 37 necessarily move, too. By this movement of the articulated supports 37, caused by opening the first arm 26*a* and the second arm 26*b*, the third widening jaw 22*c* and the fourth widening jaw 22*d* move radially away from each other 180° opposed along the second direction of motion 36*b*. The articulated supports 37 each consist of a first movable lever 38*a* and a second movable lever 38*b*. The movable levers 38*a* and 38*b* are connected with each other by the common pivot 50. Furthermore each common pivot 50 is connected with a support 23. The third widening jaw 22*c* and the fourth widening jaw 22*d* are mounted on these supports 23. The articulated supports 37 are hinged to the first arm 26*a* and to the second arm 26*b* at the pivots 39. The pivots 39 for the movable levers 38*a* and 38*b* of the articulated support 37 on which is mounted the third widening jaw 22*d*, are each guided in a sliding guide 40. The purpose of this sliding guide and its precise function are described in FIGS. 4*a* and 4*b*.

Figure 3:
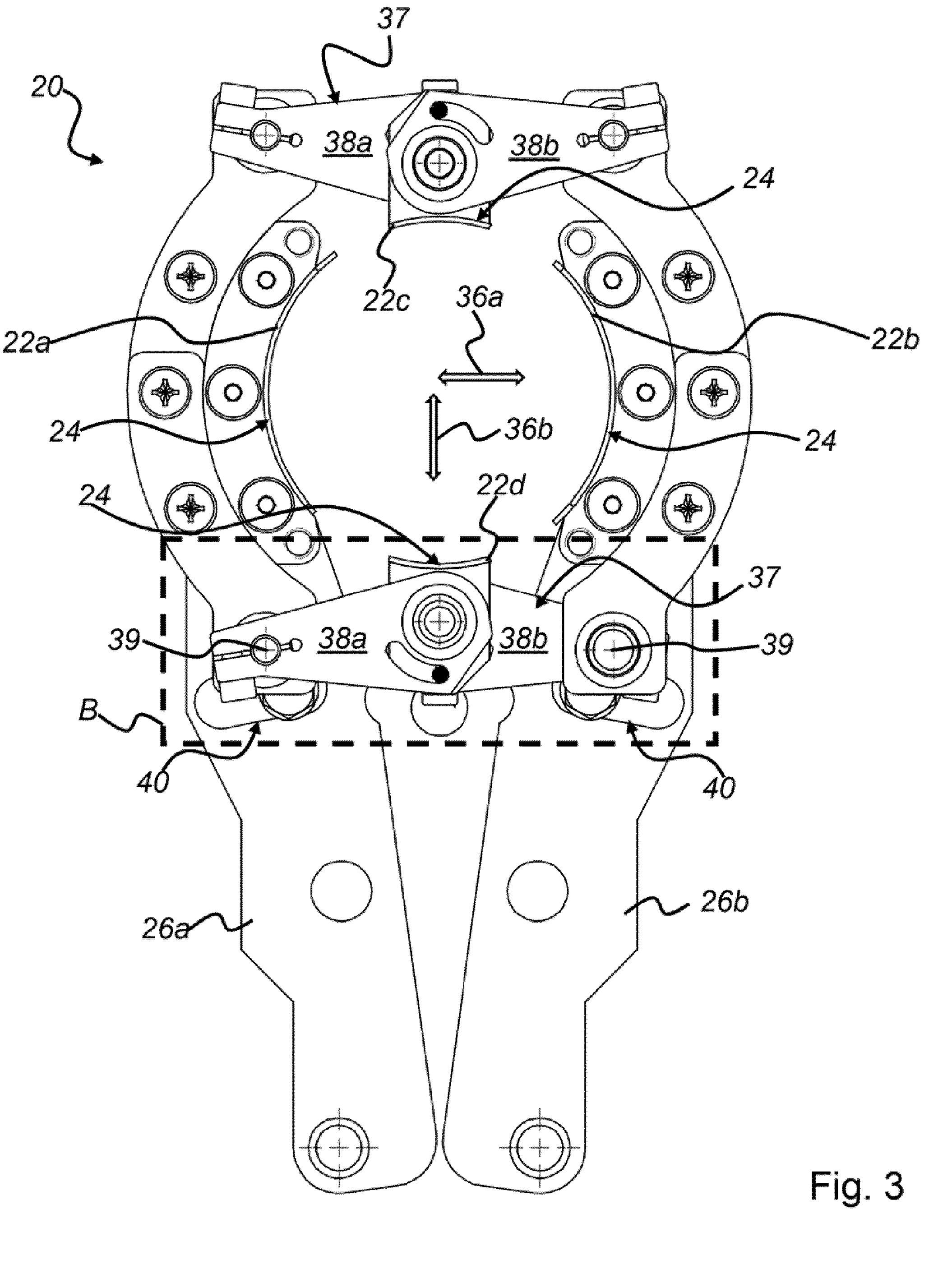
FIG. 3 schematically shows an opened widening device.

FIG. 3 schematically shows an opened widening device 20 for label sleeves 60 (see FIG. 6). The widening jaws 22*a*, 22*b*, 22*c*, and 22*d* have been moved radially outwards in the respective direction of motion 36*a* and 36*b*, so that a label sleeve (not shown) is at least partially widened. The articulated supports 37 with the movable levers 38*a* and 38*b* have been opened completely. In this embodiment the widening jaws 22*a*, 22*b*, 22*c*, and 22*d* are provided with a curved surface 24. This embodiment is particularly suited for labeling round objects like for example bottles (see FIG. 1). Furthermore the movement of the third widening jaw 22*c* and the movement of the fourth widening jaw 22*d* are limited by further sliding guides. These sliding guides are also described in greater detail for the case of the fourth widening jaw 22*d* in FIGS. 4*a* and 4*b*.

Figure 4A:
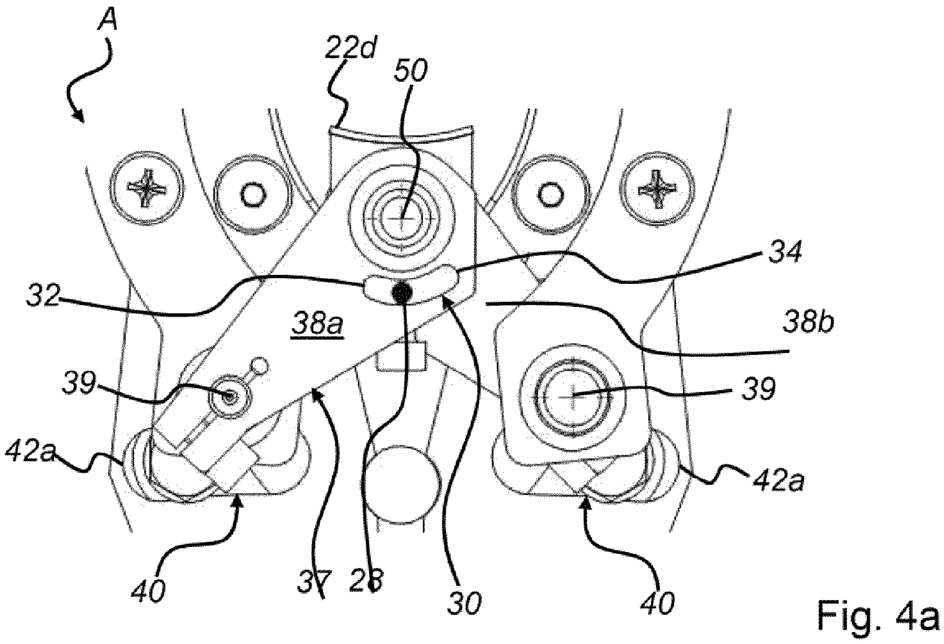
FIG. 4*a* is an enlarged representation of the section designated A in FIG. 2.

FIG. 4*a* is an enlarged representation of the section designated A in FIG. 2. The section A shows the fourth widening jaw 22*d* when the widening device is closed. The pivots 39 of the articulated support 37 of the fourth widening jaw 22*d* are situated at the outer stop positions 42*a* of the sliding guides 40. Furthermore the further sliding guide 30 for limiting the movement of the fourth widening jaw 22*d* is shown below the common pivot 50 of the movable levers 38*a* and 38*b*. This further sliding guide 30 cooperates with a pin 28. This sliding guide 30 comprises a first stop position 32 and a second stop position 34, between which the pin 28 can move. If the widening device (not shown) is completely closed, the pin is situated at the first stop position 32. If the widening device is opened, the pin 28 moves towards the second stop position 34. The second stop position 34 serves for stopping the movement of the fourth widening jaw 22*d* along the second direction of motion 36*b*. This prevents the fourth widening jaw 22*d* from moving too far in the second direction of motion 36*b* and the label sleeve (not shown) from possible overstretching. Furthermore a movement of the widening jaw 22*d* beyond a dead center (not shown) can cause technical problems when closing the widening device.

Figure 4B:
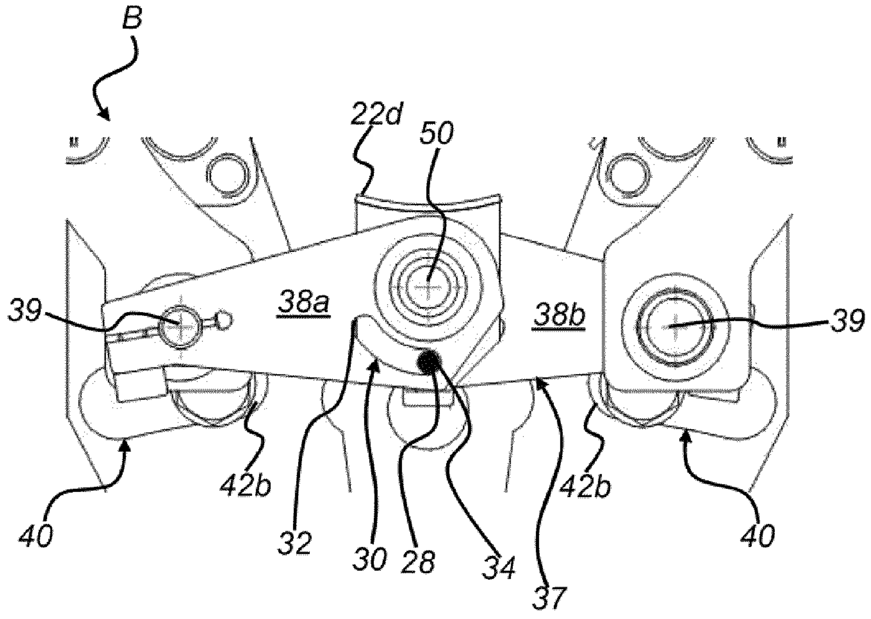
FIG. 4*b* is an enlarged representation of the section designated B in FIG. 3.

FIG. 4*b* is an enlarged representation of the section designated B in FIG. 3. The section B shows the fourth widening jaw 22*d* when the widening device (not shown) is completely opened. The pivots 39 of the articulated support 37 of the fourth widening jaw 22*d* are situated at the inner stop positions 42*b* of the sliding guides 40. The pin 28 has reached the second stop position 34 of the further sliding guide 30. In this position the opening of the widening device is stopped, so that the fourth widening jaw 22*d* cannot be moved further.

Figure 5:
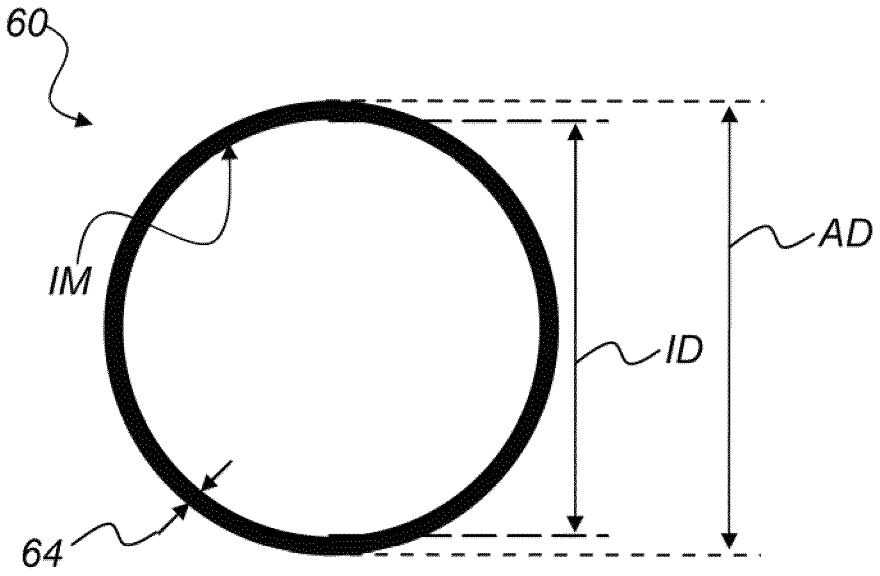
FIG. 5 schematically shows an axial view of the label sleeve.

FIG. 5 schematically shows an axial view of the label sleeve 60. The label sleeve 60 has an outer diameter AD and an inner diameter ID. The difference of the diameters is a result of the thickness 64 of the material of the label sleeve 60. Furthermore the label sleeve 60 has an inner surface IM which is engaged by the widening jaws 22*a*, 22*b*, 22*c*, and 22*d* of the widening device 20 in order to widen the label sleeve 60.

FIG. 6 schematically shows the arrangement of a label sleeve 60 prior to application on an object 70. The label sleeve 60 is widened by the widening jaws 22*a*, 22*b*, 22*c*, and 22*d*, which are provided on the widening device 20. In FIG. 6 only the first widening jaw 22*a* is shown. The label sleeve 60 is widened to an extent that the inner diameter ID of the label sleeve 60 is larger than the diameter DU of the object 70. After the widening the label sleeve 60 is slipped over the object 70 in axial direction 74.

Figure 7:
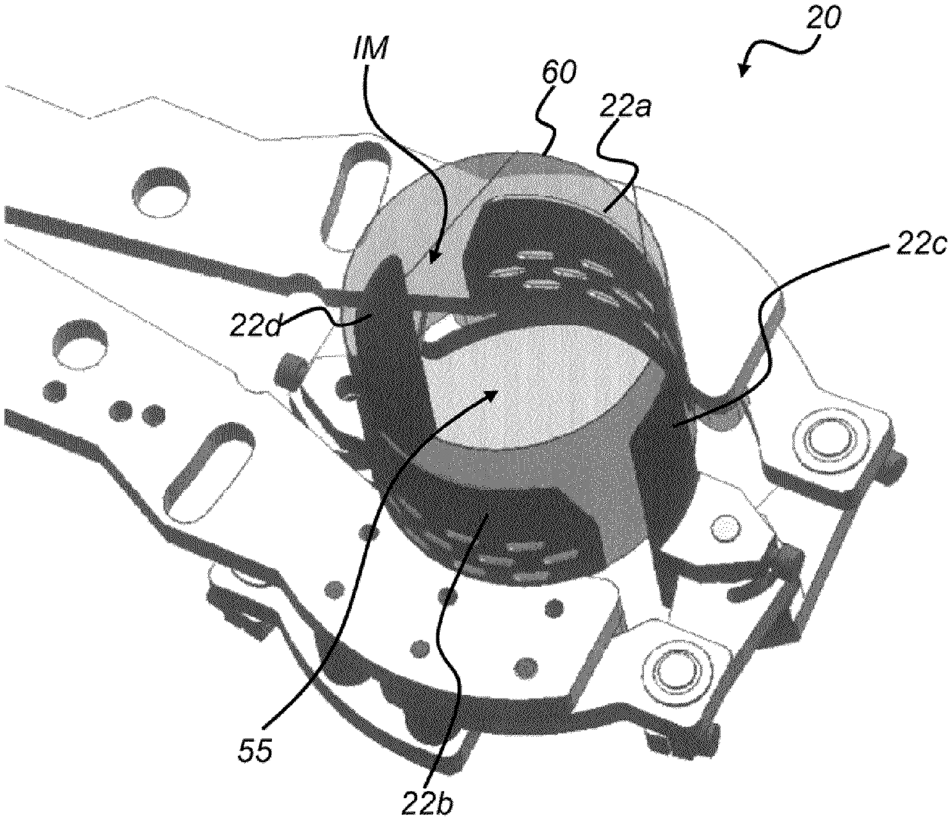
FIG. 7 shows a perspective view of the widening device with a corresponding label sleeve.

FIG. 7 shows a perspective view of the widening device 20 with a corresponding label sleeve 60. The label sleeve 60 is arranged around the widening jaws 22*a*, 22*b*, 22*c*, and 22*d* of the widening device 20. This perspective view clearly shows how the widening jaws 22*a*, 22*b*, 22*c*, and 22*d* reach into the label sleeve 60 and thus a surface of the widening jaws 22*a*, 22*b*, 22*c*, and 22*d* makes contact with the inner surface IM of the label sleeve 60. The widening device 20 thus allows widening of the label sleeve 60 in such a way that it can be slipped over the object 70 to be labeled and that the object 70 reaches into the opening 55 formed between the widening jaws 22*a*, 22*b*, 22*c*, and 22*d* of the widening device 20.

The invention has been described with reference to a preferred embodiment. It is, however, obvious to a person skilled in the art that alterations and modifications of the invention can be made, without leaving the scope of the subsequent claims.

What is claimed is:

1. A widening device for applying label sleeves on objects wherein an inner diameter of the label sleeve is smaller than a diameter of a perimeter of the objects on which the label sleeve is to be applied, the widening device comprises: first and second widening jaws, wherein the widening jaws each engage an inner surface of the label sleeve; a third widening jaw and a fourth widening jaw are movably arranged between the first widening jaw and the second widening jaw in such a way that the third widening jaw and the fourth widening jaw also engage the inner surface of the label sleeve; a pair of articulated supports wherein one of the pair of articulated supports carries the third widening jaw and one of the pair of articulated supports carries the fourth widening jaw, wherein each of the pair of articulated supports includes a first movable lever and a second movable lever and a respective common pivot for pivotably connecting each of the pairs of the first movable levers and the second movable levers;

wherein the first widening jaw is hingeably mounted on a first arm, and the second widening jaw is hingeably mounted on a second arm; and, wherein the levers are hinged with a respective end opposite the respective common pivot to a first arm and to a second arm with a second respective pivot.

2. The widening device of claim 1, wherein the third widening jaw and the fourth widening jaw, respectively, are connected with the respective common pivot for the levers by a support.

3. The widening device of claim 2, wherein the first arm and the second arm each exhibit a pair of sliding guides, in which each of the ends of each one of the pair of movable levers opposite each of the common pivots are guidable.

4. The widening device of claim 1, wherein one of each of the pairs movable levers of the support exhibit a further sliding guide engaged by a pin to limit the movement in the second direction of motion of the third widening jaw and the fourth widening jaw connected with the respective pair of first and second levers.

5. The widening device of claim 1, wherein the widening jaws exhibit at least one curved surface.

6. The widening device of claim 5, wherein the widening jaws have the shape of an arch.

7. A widening device for applying label sleeves on objects wherein an inner diameter of the label sleeve is smaller than a diameter of a perimeter of the objects on which the label sleeve is to be applied, the widening device comprises: two articulated widening jaws, wherein the widening jaws engage an inner surface of the label sleeve; a third widening jaw and a fourth widening jaw are movably arranged between the first widening jaw and the second widening jaw in such a way that the third widening jaw and the fourth widening jaw also engage the inner surface of the label sleeve; an articulated support which carries the third widening jaw and the fourth widening jaw, wherein the articulated support is made up of a first and a second movable lever and a common pivot for pivotably connection the levers and wherein the first widening jaw and the second widening jaw are movable in a radial direction towards and away from each other, and wherein the third widening jaw and the fourth widening jaw are movable in a radial direction towards and away from each other, so as to disengage the inner surface of the label sleeve or to engage the inner surface of the label sleeve; and, wherein a first direction of motion of the first widening jaw and of the second widening jaw, respectively, are 180° opposed, and wherein a second direction of motion of the third widening jaw and of the fourth widening jaw, respectively, are 180° opposed.

8. The widening device for applying label sleeves on objects wherein an inner diameter of the label sleeve is smaller than a diameter of a perimeter of the objects on which the label sleeve is to be applied as recited in claim 1 wherein each of the of the first widening jaw, second widening jaw, third widening jaw, and fourth widening extends in the same direction above the pair of articulated supports.

9. An object labeled by a widening device for applying label sleeves, comprising: a perimeter diameter which is larger than an inner diameter of the label sleeve; wherein the widening device includes: first and second widening jaws, wherein the widening jaws each engage an inner surface of the label sleeve; a third widening jaw and a fourth widening jaw are movably arranged between the first widening jaw and the second widening jaw in such a way that the third widening jaw and the fourth widening jaw also engage the inner surface of the label sleeve; a pair of articulated supports wherein one of the pair of articulated supports carries the third widening jaw and one of the pair of articulated supports carries the fourth widening jaw, wherein each of the pair of articulated supports includes a first movable lever and a second movable lever and a respective common pivot for pivotably connecting each of the pairs of the first movable levers and the second movable levers;

wherein the first widening jaw is hingeably mounted on a first arm, and the second widening jaw is hingeably mounted on a second arm; and, wherein the levers are hinged with a respective end opposite the respective common pivot to a first arm and to a second arm with a second respective pivot.

* * * * *

UNITED STATES PATENT AND TRADEMARK OFFICE

CERTIFICATE OF CORRECTION

PATENT NO. : 8,584,334 B2
APPLICATION NO. : 12/632197
DATED : November 19, 2013
INVENTOR(S) : Hermann Solleder et al.

It is certified that error appears in the above-identified patent and that said Letters Patent is hereby corrected as shown below:

In the Claims

In column 6, line 58, claim 1, line 18, the word "hingeably" should be deleted.
In column 6, line 59, claim 1, line 19, the word "hingeably" should be deleted.
In column 6, line 62, claim 1, line 22, the first occurrence of the word "a" should be changed to --the--.
In column 6, line 63, claim 1, line 23, the word "a" should be changed to --the--.
In column 7, line 2, claim 3, line 2, the words "pair of" should be deleted.
In column 7, line 2, claim 3, line 2, the word "guides" should be changed to --guide--.
In column 7, line 3, claim 3, line 3, the word "each" should be deleted.
In column 7, line 3, claim 3, line 3, the word "pair" should be changed to the word --pairs--.
In column 7, line 4, claim 3, line 4, the word --respective-- should be inserted before the word common.
In column 7, line 4, claim 3, line 4, the words "pivots are" should be replaced by the words --pivot is--.
In column 8, line 28, claim 9, line 18, the word "hingeably" should be deleted.
In column 8, line 29, claim 9, line 19, the word "hingeably" should be deleted.
In column 8, line 32, claim 9, line 22, the first and second occurrences of the word "a" should both be changed to the word "the".

Signed and Sealed this
Thirteenth Day of May, 2014

Michelle K. Lee

Michelle K. Lee
*Deputy Director of the United States Patent and Trademark Office*

UNITED STATES PATENT AND TRADEMARK OFFICE

CERTIFICATE OF CORRECTION

PATENT NO. : 8,584,334 B2
APPLICATION NO. : 12/632197
DATED : November 19, 2013
INVENTOR(S) : Hermann Solleder et al.

It is certified that error appears in the above-identified patent and that said Letters Patent is hereby corrected as shown below:

In the Claims

In column 7 line 4, Claim 3, line 4 - the words “each of” after the word “opposite” should be deleted.

Signed and Sealed this
Twenty-eighth Day of October, 2014

Michelle K. Lee
*Deputy Director of the United States Patent and Trademark Office*